United States Patent
Hung et al.

(10) Patent No.: US 9,924,398 B2
(45) Date of Patent: Mar. 20, 2018

(54) METHOD FOR REDUCING LOAD BY FILTERING OUT BROADCAST MESSAGES

(71) Applicant: Quanta Computer Inc., Taoyuan (TW)

(72) Inventors: Chin-Te Hung, Taoyuan (TW); Te-Hsien Lai, Taoyuan (TW); Chin-Tsai Yen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/980,661

(22) Filed: Dec. 28, 2015

(65) Prior Publication Data

US 2017/0105137 A1    Apr. 13, 2017

Related U.S. Application Data

(60) Provisional application No. 62/240,766, filed on Oct. 13, 2015.

(51) Int. Cl.
| | |
|---|---|
| *H04J 1/16* | (2006.01) |
| *H04W 28/02* | (2009.01) |
| *H04L 12/26* | (2006.01) |
| *H04W 72/00* | (2009.01) |
| *H04L 12/18* | (2006.01) |
| *H04L 12/841* | (2013.01) |
| *H04L 12/823* | (2013.01) |

(52) U.S. Cl.
CPC ......... *H04W 28/0215* (2013.01); *H04L 12/18* (2013.01); *H04L 43/028* (2013.01); *H04L 47/28* (2013.01); *H04L 47/32* (2013.01); *H04W 72/005* (2013.01)

(58) Field of Classification Search
CPC ........................ H04W 28/0215; H04W 72/005
USPC ........................................... 370/230
See application file for complete search history.

(56) References Cited

U.S. PATENT DOCUMENTS

2008/0123649 A1* 5/2008 Wang .................... G06F 13/387
370/392
2009/0060506 A1* 3/2009 Matsunaga ........ H04Q 11/0005
398/53

* cited by examiner

*Primary Examiner* — Peter Cheng
(74) *Attorney, Agent, or Firm* — Nixon Peabody LLP; Eduardo J. Quinones

(57) ABSTRACT

Systems, methods, and computer-readable media for reducing load by filtering out broadcast messages. In some embodiments, a system may receive a broadcast message at a device at a first time. The system can monitor the device until a second time when a pre-determined number of broadcast messages have been received at the device. Based on a difference between the first time and the second time, the system can determine a filtering time duration. The system can then filter out further broadcast messages received at the device after the second time for a period of time that is equivalent to the filtering time duration.

17 Claims, 10 Drawing Sheets

| 402 | 404 | 406 | 408 |
|---|---|---|---|
| LEVEL (L) | MESSAGES PER UNIT TIME | TIME TO REACH $P_0$ ($T_P(L)$) | FILTERING TIME ($T_f(L)$) |
| 0 | $P_0$ | $T_{P_0}$ | $T_{f_0}$ |
| 1 | $P_1$ | $T_{P_1} (= T_{P_0} \times (P_0/P_1))$ | $T_{f_1}$ |
| 2 | $P_2$ | $T_{P_2} (= T_{P_0} \times (P_0/P_2))$ | $T_{f_2}$ |
| 3 | $P_3$ | $T_{P_3} (= T_{P_0} \times (P_0/P_3))$ | $T_{f_3}$ |
| ⋮ | ⋮ | ⋮ | ⋮ |
| N | $P_N$ | $T_{P_N} (= T_{P_0} \times (P_0/P_N))$ | $T_{f_N}$ |

*FIG. 4A*

| 452 | 454 | 456 | 458 |
|---|---|---|---|
| LEVEL (L) | MESSAGES PER SECOND | ($T_P(L)$) | ($T_f(L)$) |
| 0 | 10 | 1 | 0 |
| 1 | 20 | 0.5 | 0.2 |
| 2 | 50 | 0.2 | 0.6 |
| 3 | 200 | 0.05 | 1.4 |

*FIG. 4B*

METHOD FOR REDUCING LOAD BY FILTERING OUT BROADCAST MESSAGES

CROSS REFERENCE TO RELATED APPLICATIONS

This instant application claims priority to U.S. Provisional Application No. 62/240,766, filed Oct. 13, 2015, entitled "Method for reducing loading by a large number of broadcast", the contents of which are incorporated by reference herein in its entirety.

BACKGROUND

In a network environment where a large number of network broadcast packets are exchanged, the performance of the individual network devices can suffer due to the high volume of packets that need to be processed. Devices within the network with slower processing speed may not be able to provide adequate service due to the amount of computing resources being diverted to process the incoming broadcast packets.

Traditional broadcast storm resistance mechanisms include, (1) the Media Access Controller (MAC) of a network controller limiting the maximum amount of broadcast packets being received in a fixed time unit, (2) disabling the device from receiving broadcast packets for a constant time if the number of broadcast packets received during a fixed measuring period exceeds a threshold value, and (3) disabling the device from receiving broadcast packets for a dynamic time according to the number of broadcast packets received during a fixed measuring period.

However, the first method may not adapt because this functionality is not generally equipped in most MACs. The second and third methods may be inadequate because they may filter out too many broadcast packets and thereby cause higher failure rate for those protocols that rely on the use of broadcast packets. The second and third methods may be both problematic because filtering cannot be initiated until the fixed measuring period is over, during which time the device can be quickly overwhelmed. Therefore, there exists a need for an improved method of filtering out broadcast packets and thereby reducing network load of a device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for filtering out broadcast messages. In some embodiments, the system can receive a broadcast message a device at a first time. The message can be a cell, a frame, a packet, or a datagram. The first time is recorded for future reference. A counter, previously set to 0, may be incremented by 1 to signify that the first broadcast message has been received at the device. The system can further monitor the device until a second time when a pre-determined number of broadcast messages have been received at the device. In order to do this, every time a packet is received at the device, the system can determine whether the message is a broadcast message and then increment the counter by 1 if it is. When the counter is equal to the pre-determined number, then the second time can be retrieved and recorded.

The system can find the difference between the first time and the second time (i.e., subtracting the first time from the second time) to identify the broadcasting time. Based on the broadcasting time, a filtering time duration may be determined. The filtering time duration can be determined by looking up the broadcasting time in a table that maps various levels of broadcasting times to recommended filtering time durations. According to the table, the recommended filtering time durations may increase as the broadcasting times decrease.

Once the recommended filtering time duration is determined based on the observed broadcasting time, the system can apply the filtering time by disabling the device from receiving any further broadcast messages for a period of time that is equal to the recommended filtering time duration. After the filtering timer expires and the device is re-enabled to receive broadcast messages, the system can reset the counter and start the process all over again to measure how long it takes to receive the next pre-determined number of broadcasting messages.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 4A and 4B show example tables for determining a filtering time duration;

DETAILED DESCRIPTION

Figure 1:
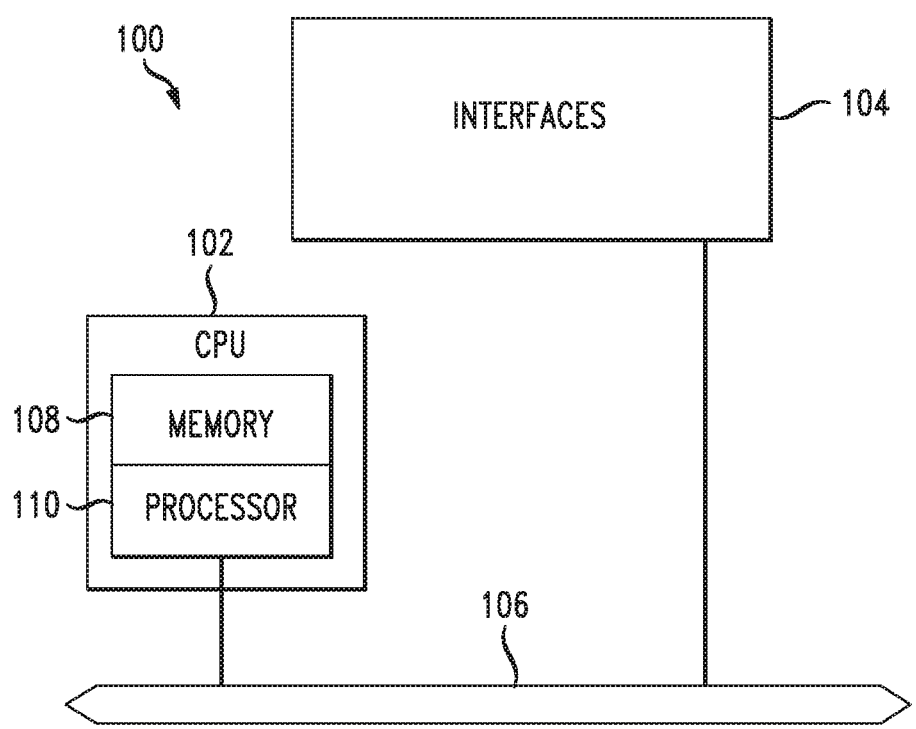
FIG. 1 shows an example network device according to some aspects of the subject technology.
Figure 2A:
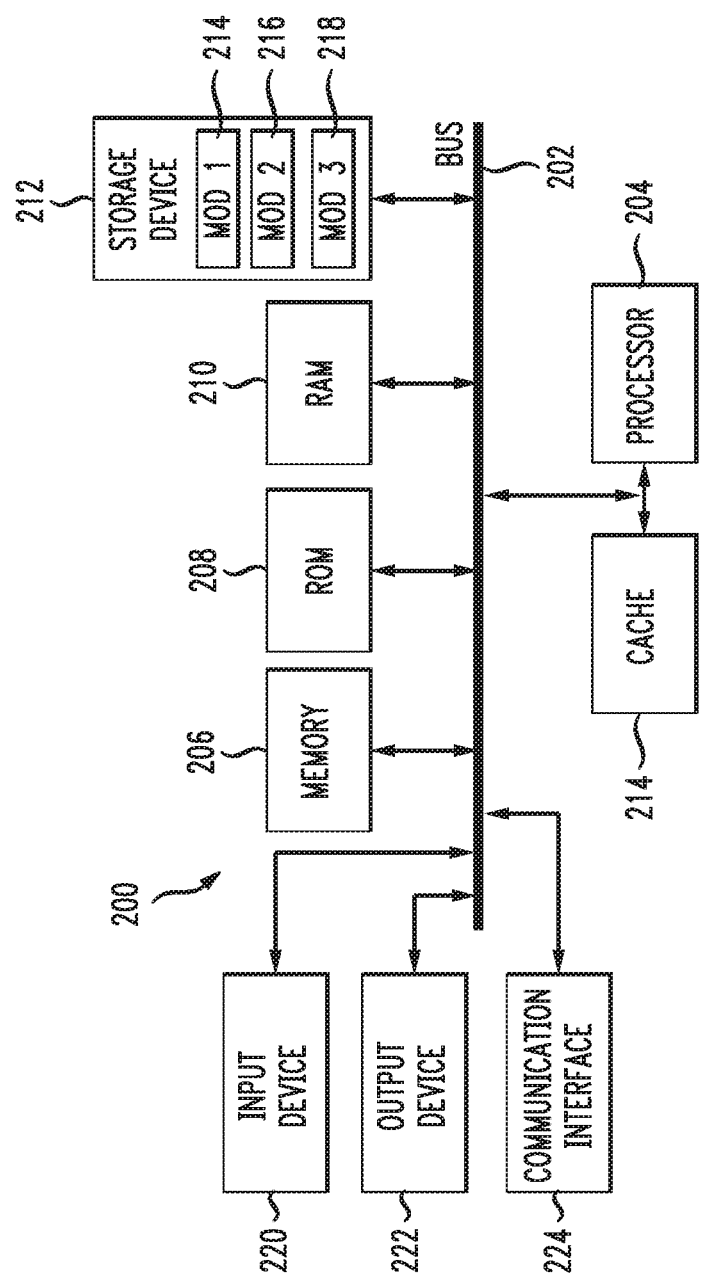
FIGS. 2A and 2B shows example system embodiments according to some aspects of the subject technology.
Figure 2B:
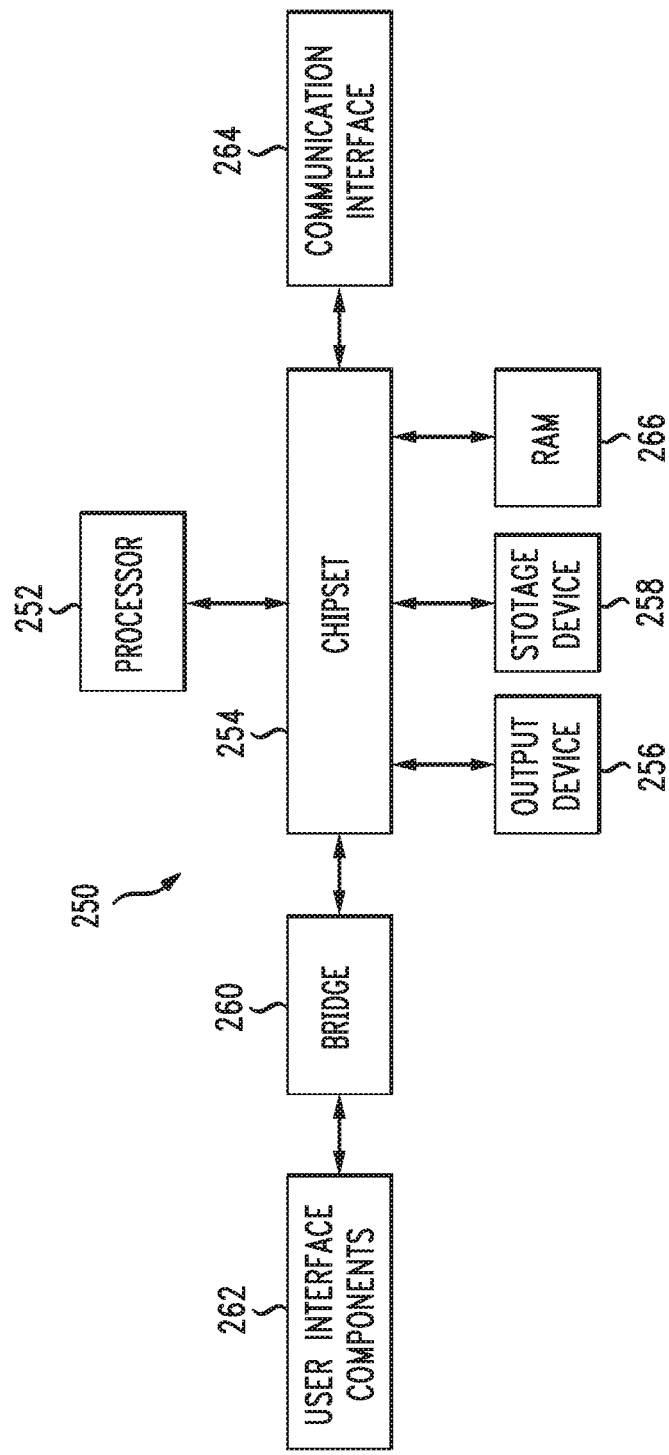

The disclosed technology addresses the need in the art for load balancing on a network device. Disclosed are systems, methods, and computer-readable storage media for filtering out broadcast messages. A brief introductory description of exemplary systems and networks, as illustrated in FIGS. 1 and 2A-B, is disclosed herein. A detailed description of filtering schemes for broadcast messages, related concepts, and exemplary variations, will then follow. These variations shall be described herein as the various embodiments are set forth.

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network. The disclosure now turns to FIG. 1.

A message is one or more bits of data communicated via a network (especially a packet-switched network) from one network-capable device to another network-capable device. The message can be generated and consumed according to one or more communications protocol. Depending on the communication protocol and/or the network layer being used, the message may be called a frame, a packet, a datagram, a cell, a segment, etc. However, throughout this disclosure, these terminologies may be used interchangeably as the principles and ideas introduced in this disclosure can be generally applicable to messages of any protocol or layer.

FIG. 1 illustrates an exemplary network device 100 suitable for implementing the present invention. Network device 100 includes a master central processing unit (CPU) 102, interfaces 104, and a bus 106 (e.g., a PCI bus). When acting under the control of appropriate software or firmware, the CPU 102 is responsible for executing packet management, error detection, and/or routing functions, such as miscabling detection functions, for example. The CPU 102 preferably accomplishes all these functions under the control of software including an operating system and any appropriate applications software. CPU 102 may include one or more processors 110 such as a processor from the Motorola family of microprocessors or the MIPS family of microprocessors, or the ARM family of microprocessors. In an alternative embodiment, processor 110 is specially designed hardware for controlling the operations of network device 100. In a specific embodiment, a memory 108 (such as non-volatile RAM and/or ROM) also forms part of CPU 102. However, there are many different ways in which memory could be coupled to the system.

The interfaces 104 are typically provided as interface cards (sometimes referred to as "line cards"). Generally, they control the sending and receiving of data packets over the network and sometimes support other peripherals used with the network device 100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 102 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the network device 100.

Regardless of the network device's configuration, it may employ one or more memories or memory modules (including memory 108) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Network device 100 can be any device that is capable of processing data communicated via a network. For example, network device 100 can be a computer, a desktop computer, a mobile computing device, a server, a switch, a router, a gateway, a bridge, a media access controller, a virtual machine, a hypervisor, a Baseboard Management Controller (BMC) system, etc. The network can be a LAN, a WAN, etc.

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 202. Exemplary system 200 includes a processing unit (CPU or processor) 204 and a system bus 202 that couples various system components including the system memory 206, such as read only memory (ROM) 208 and random access memory (RAM) 210, to the processor 204. The system 200 can include a cache of high-speed memory connected directly with, in close proximity to, or integrated as part of the processor 204. The system 200 can copy data from the memory 206 and/or the storage device 212 to the cache 214 for quick access by the processor 204. In this way, the cache can provide a performance boost that avoids processor 204 delays while waiting for data. These and other modules can control or be configured to control the processor 204 to perform various actions. Other system memory 206 may be available for use as well. The memory 206 can include multiple different types of memory with different performance characteristics. The processor 204 can include any general purpose processor and a hardware module or software module, such as module 1 (214), module 2 (216), and module 3 (218) stored in storage device 212, configured to control the processor 204 as well as a special-purpose processor where software instructions are incorporated into the actual processor design. The processor 204 may essentially be a completely self-contained computing system, containing multiple cores or processors, a bus, memory controller, cache, etc. A multi-core processor may be symmetric or asymmetric.

To enable user interaction with the computing device 200, an input device 220 can represent any number of input mechanisms, such as a microphone for speech, a touch-sensitive screen for gesture or graphical input, keyboard, mouse, motion input, speech and so forth. An output device 222 can also be one or more of a number of output mechanisms known to those of skill in the art. In some instances, multimodal systems can enable a user to provide multiple types of input to communicate with the computing device 200. The communications interface 224 can generally govern and manage the user input and system output. There is no restriction on operating on any particular hardware arrangement and therefore the basic features here may easily be substituted for improved hardware or firmware arrangements as they are developed.

Storage device 212 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 210, read only memory (ROM) 208, and hybrids thereof.

The storage device 212 can include software modules 214, 216, 218 for controlling the processor 204. Other hardware or software modules are contemplated. The storage device 212 can be connected to the system bus 202. In one aspect, a hardware module that performs a particular function can include the software component stored in a computer-readable medium or device in connection with the necessary hardware components, such as the processor 204, bus 202, display 222, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 252, representative of any number of physically and/or logically distinct resources capable of executing software, firmware, and hardware configured to perform identified computations. Processor 252 can communicate with a chipset 254 that can control input to and output from processor 252. In this example, chipset 254 outputs information to output device 256, such as a display, and can read and write information to storage device 258, which can include magnetic media, and solid state media, for example. Chipset 254 can also read data from and write data to RAM 266. A bridge 260 for interfacing with a variety of user interface components 262 can be provided for interfacing with chipset 254. Such user interface components 262 can include a keyboard, a microphone, touch detection and processing circuitry, a pointing device, such as a mouse, and so on. In general, inputs to system 250 can come from any of a variety of sources, machine generated and/or human generated.

Chipset 254 can also interface with one or more communication interfaces 264 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 252 analyzing data stored in storage 258 or 266. Further, the machine can receive inputs from a user via user interface components 262 and execute appropriate functions, such as browsing functions by interpreting these inputs using processor 252.

It can be appreciated that exemplary systems 200 and 250 can have more than one processor 204 or be part of a group or cluster of computing devices networked together to provide greater processing capability.

Figure 3A:
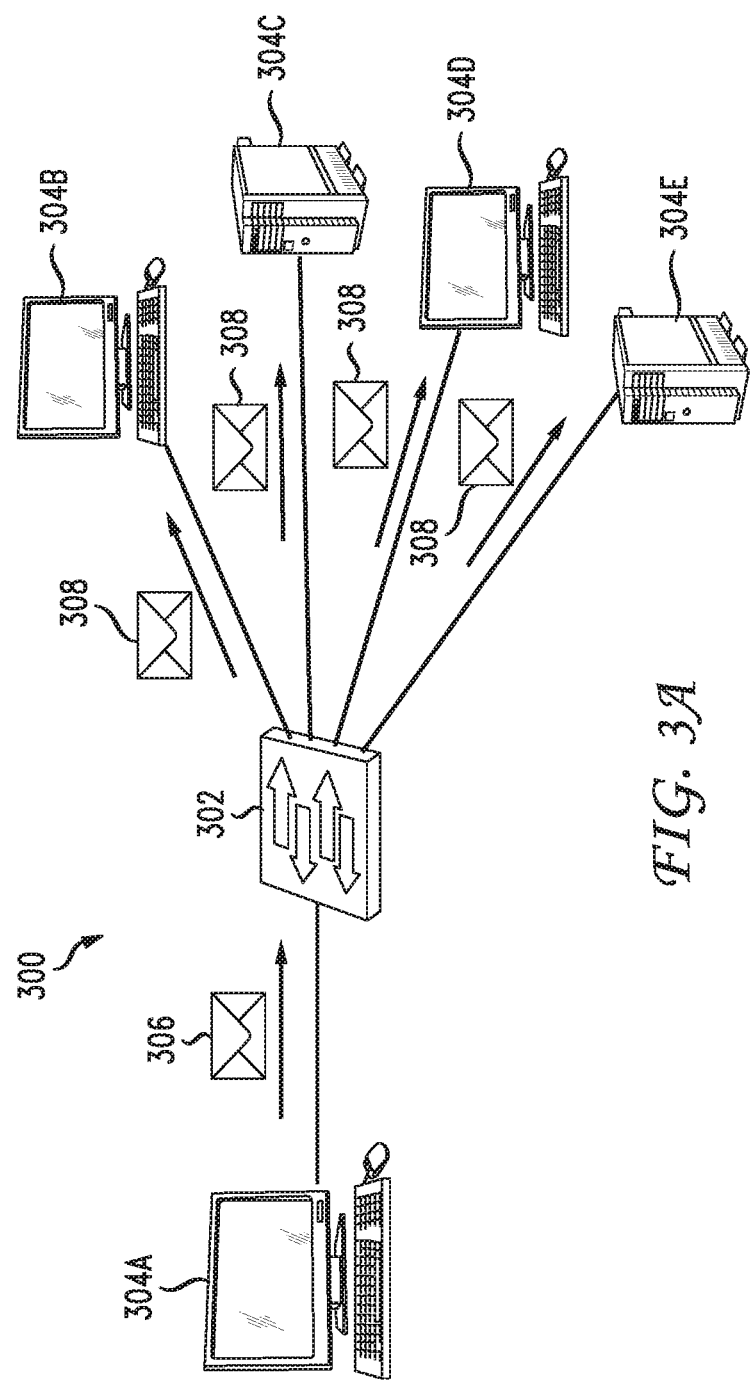
FIG. 3A shows an example network device processing a broadcast message.

FIG. 3A shows an example network device processing a broadcast message. Example network 300 can be a network utilizing any Open Systems Interconnection (OSI) model layer. For example, network 300 can be a layer 2 (data link layer) network using the Ethernet protocol. Network 300 can also be a layer 3 (network layer) network using the Transmission Control Protocol/Internet Protocol (TCP/IP).

In example network 300, network device 302 is communicatively connected to other network-capable devices such as hosts $304_A$, $304_B$, $304_C$, $304_D$, $304_E$ (collectively "304"). Although network device 302 is depicted as a switch in FIG. 3A, it can be any computing device that is capable of receiving, transmitting, and/or processing data via one or more communication channels. For example, network device 302 can also be a computer, a server, a virtual machine, a hypervisor, a router, a gateway, a bridge, etc. Especially, network device 302 can be a media access controller, which is software and/or hardware that implements the media access control (MAC) layer and is capable of communicating in the MAC protocol. Similarly, each of hosts 304 can be a computer, a server, a virtual machine, a hypervisor, a Baseboard Management Controller (BMC) system, etc. There also can be other network devices and equipment (not shown) that are located between network device 302 to hosts 304 to relay, forward, and route messages. Network device 302 and hosts 304 can communicate through one or more communication protocols belonging to one or more OSI layers.

In this example, host $304_A$ can send out broadcast message 306 to other devices in network 300. A broadcast message is a message that is meant to be received by all network nodes in a given node instead of by one or more specified nodes. Thus, broadcast message 306 may contain a broadcast address for its destination address. For example, broadcast message 306 can be an Ethernet frame having for the destination MAC address a broadcast address of "FF-FF-FF-FF-FF-FF." In another example, broadcast message 306 can be a IP packet having a broadcast IP address "192.168.255.255" as its destination IP address. When network device 302 receives broadcast message 306, network device 302 would typically send out other broadcast messages 308 to every node that is attached to network device 302 such as hosts $304_B$, $304_C$, $304_D$, $304_E$ or other switches, routers, gateways, etc. These devices, in turn, may further propagate the message by sending the message out to yet other devices.

When handling broadcast messages such as broadcast 306, however, network device may also selectively honor the broadcast request. In other words, network device 302 may broadcast some broadcast messages while dropping or filtering out other broadcast messages. This may be especially useful or even necessary when network 300 experiences a high volume of traffic and is inundated with too many broadcast messages being transmitted among network nodes. Processing a broadcast takes resources such as a processor, memory, storage, etc. When network device gets overwhelmed with too much traffic, especially broadcast messages, network device 302 may not be able to allocate resources to servicing other packets, resulting in lost packets, delays, jitter, decreased bandwidth, etc. Thus, it may be beneficial for network device 302 to filter out certain broadcast messages or filter out all broadcast messages for a specific duration of time. The messages being filtered out can be simply dropped or discarded. The methods of determining the filtering duration time will be further discussed below.

Figure 3B:
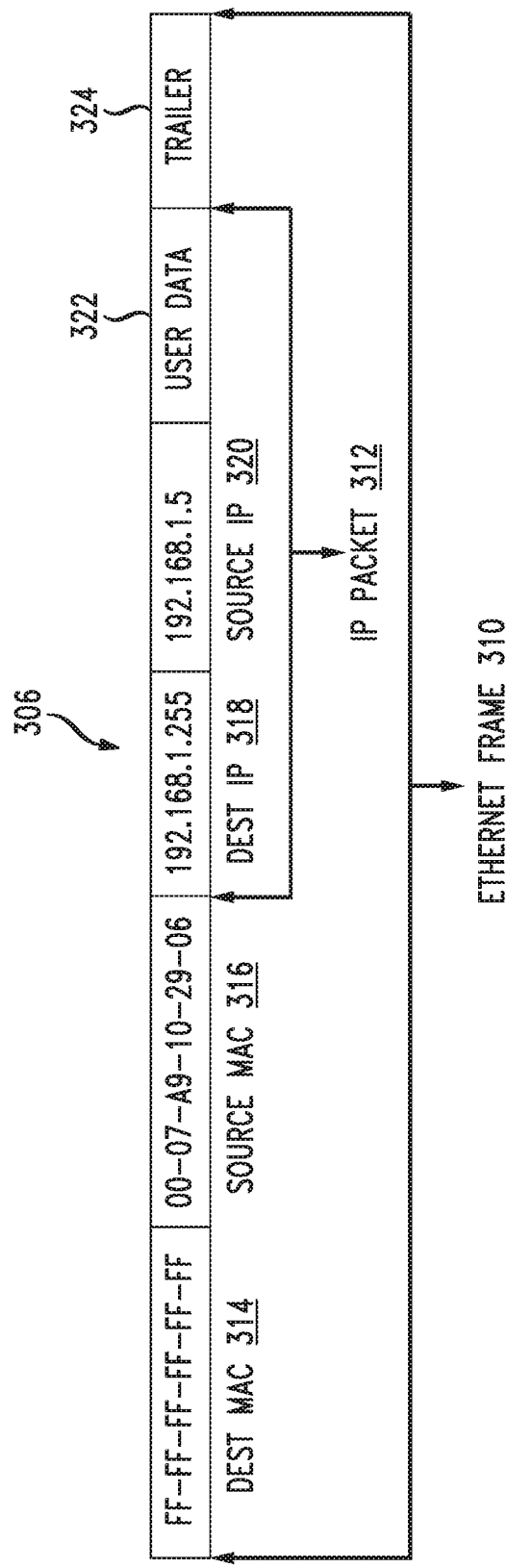
FIG. 3B shows an example broadcast message.

FIG. 3B shows an example broadcast message. In this example, broadcast message 306 is Ethernet frame 310, which encapsulates IP packet 312. Ethernet frame 310 contains destination MAC address 314 and source MAC 316 address as its header; IP packet 312 as its payload; and trailer 324. Source MAC address 316 indicates the MAC address for the frame's source, which in this example is host $304_A$ of FIG. 3A. Destination MAC address 314 for broadcast message 306 is "FF-FF-FF-FF-FF-FF," which informs a receiving network device to try to relay Ethernet frame 310 to all the other network nodes in the corresponding LAN segment. IP packet 312, which is encapsulated inside Ethernet frame 310 as part of its payload, may include destination IP address 318, source IP address 320, and user data 322. Source IP address 320 (i.e., "192.168.1.5") can be the IP address that corresponds to source host $304_A$. Destination IP address 318 can be an IP version 4 (IPv4) broadcast address, which is typically obtained by performing a bitwise OR operation between the bit complement of the subnet mask and the IP address of the host. In this example, such broadcast IP address is "192.168.1.255."

FIG. 4A shows an example table for determining a filtering time duration. Table 400 represents exemplary mappings of filtering level 402, messages per unit time (404), time to reach $P_0$ (406), and filtering time 408. Table 400 can be stored as a data structure inside network device 302 or a remote device within network 300 of FIG. 3A. The entries in table 400 can be pre-determined prior to receiving a broadcast message or can be dynamically adjusted according to the various conditions and performances of the network. The various numbers in table 400 can be determined empirically through experimentations such that ideal or near-ideal numbers may be found to minimize the downtime of network device 302 and maximize its resource usage. Various levels 402 in table 400 represent different levels, degrees, or intensity of filtering. For example, Level 0 ($410_0$) can represent the lowest level of filtering where the least amount of broadcast messages will be dropped. The next level up, Level 1 ($410_1$) can represent the next lowest level of filtering where the amount of broadcast messages being dropped will be higher than in Level 0 but lower than in the next level, Level 2. As such, Level N ($410_N$) can represent the highest level of filtering where the most amount of broadcast messages will be dropped by network device 302.

Messages per unit time (404) represents an estimation of the number of messages that may be received within a given time in each level. Especially, a messages per unit time (404) value for a level can represent a lower-bound threshold for the number of messages that are received for that level. For example, let assume that P represents the number of broadcast messages received by network device 302. Then, if $P_1 \leq P < P_2$, then network device 302 can be assigned Level 1. Similarly, if $P_2 \leq P < P_3$, then network device 302 can be assigned Level 2, and so forth. Moreover, network device 302 with any value of P that is less than $P_1$ (i.e., $P<P_1$) can be assigned Level 0. As will be discussed later, the value $P_0$ for Level 0 can be the base value for determining the relationships between Level 0 and other levels and for calculating time to reach $P_0$ (406). The unit time can be any pre-determined amount of time such as 1 second, 2 seconds, 5 seconds, 1 minute, 1 hour, 2 hours, etc. Messages per unit time (404) may simply represent the ratios of received messages to the unit time instead of the actual number of messages received within a given unit time. For example, $P_2$ may represent the equivalent amount of messages that network device 302 may receive within the unit time, and may not necessarily mean that network device 302 has actually received $P_2$ broadcast messages within the unit time. In addition, since levels 402 are the classification for the amount of broadcast messages being received per unit time in the increasing order, it follows that $P_0<P_1<P_2<P_3< \ldots <P_N$.

Time to reach $P_0$ (406) can represent the amount or duration of time that it takes network device 302 to receive broadcast messages in the amount of $P_0$ for each level. Especially, a time to reach $P_0$ (406) value for a level can represent an upper bound threshold for the time it takes a device to receive $P_0$ broadcast messages for that level. For example, $Tp_1$ can be the upper bound threshold for the time it takes a device to receive $P_0$ amount of broadcast messages to be placed at least in Level 1 ($410_1$). Similarly, $Tp_2$ can be the upper bound for Level 2 ($410_2$) and so forth. Meanwhile, $Tp_0$ can represents the unit time in table 400 because that is the amount of time it takes the device to receive $P_0$ broadcast messages in Level 0 at the rate of $P_0$ broadcast messages per unit time. For example, if the unit time for table 400 is 1 second, then $Tp_0$ would also be 1 second. Additionally, it also follows that $Tp_1=Tp_0 \times (P_0/P_1)$, $Tp_2=Tp_0 \times (P_0/P_2)$, $Tp_3=Tp_0 \times (P_0/P_3)$, ..., $Tp_N=Tp_0 \times (P_0/P_N)$. The relationship between level 402 and time to reach $P_0$ (406) can be described by the function Tp(L), where L is the level. Thus, in example table 400, $Tp(0)=Tp_0$, $Tp(1)=Tp_1$, $Tp(2)=Tp_2$, $Tp(3)=Tp_3$, ... $Tp(N)=Tp_N$, where $Tp_0$, $Tp_1$, $Tp_2$, ... $Tp_N$ are pre-determined or dynamically determined constants. Since $P_0<P_1<P_2<P_3< \ldots <P_N$, it also follows that $Tp_0>Tp_1>Tp_2> \ldots >Tp_N$, because $P_0 \times Tp_0 = P_1 \times Tp_1 = P_2 \times Tp_2 = P_3 \times Tp_3 = \ldots = P_N \times Tp_N$.

Filtering time 408 represents the time period or time duration during which the filtering is to take place. Thus, for Level 0 ($410_0$), network device 302 can filter out or drop broadcast messages for the time amount corresponding to $Tf_0$. Similarly, the filtering time for Level 1 ($410_1$) can be $Tf_1$ and so forth. Filtering time 408 generally increases as level 402 increases because higher levels are, in general, associated with more congestion and thus more need to filter out extraneous messages. Thus, in general, $Tf_0 \leq Tf_1 \leq Tf_2 \leq Tf_3 < \ldots \leq Tf_N$, although one of skill in the art will understand that this is not an absolute rule. Moreover, filtering time 400 for Level 0 ($410_0$) can be 0 (i.e., $Tf_0=0$). The relationship between level 402 and filtering time 408 can be described by the function Tf(L), where L is the level. Thus, in example table 400, $Tf(0)=Tf_0$, $Tf(1)=Tf_1$, $Tf(2)=Tf_2$, $Tf(3)=Tf_3$, ... $Tf(N)=Tf_N$, where $Tf_0$, $Tf_1$, $Tf_2$, ... $Tf_N$ are pre-determined or dynamically determined constants.

Table 400 can be used to determine what level 402 and filtering time 408 should be assigned for a given value of time. Let us assume that T-broadcast is the duration time that it actually took network device 302 to receive $P_0$ broadcast messages within the unit time, $Tp_0$. The default filtering level is typically Level 0 ($410_0$) because it is the lowest level and we do not know yet whether a device is experiencing heavy traffic, which would warrant raising the filtering level to Level 1 ($410_1$) or higher. Thus, if it is found that T-broadcast>Tp(1), then the filtering level stays at Level 0

($410_0$) and the corresponding filtering time 408 is Tf(L)=Tf(0)=$Tf_0$. However, if it is found that Tp(1)≥T-broadcast>Tp(2), then the filtering level can be raised to Level 1 ($410_1$) and the filtering time can be set to Tf(L)=Tf(1)=$Tf_1$. Thus, in general, if there can be found an L in table 400 where Tp(L)≥T-broadcast>Tp(L+1), then T-filter=Tf(L). Moreover, since N is the highest level in table 400, T-filter=Tf(1V), when T-broadcast≤Tp(N). One of skill in the art will understand that some boundary conditions can be adjusted without negatively affecting the usefulness of the disclosed methods. For example, T-filter=Tf(L), when Tp(L)>T-broadcast≥Tp(L+1).

FIG. 4B shows an example table for determining a filtering time duration. Example table 450 is derived from table 400 but the values are replaced by example number values. For example, table 450 is shown to have 4 discrete filtering levels 452 with Level 0 (460) as the lowest level and Level 3 (466) as the highest level. The unit time in table 450 is 1 second. Thus, messages per second (454) column lists 10 (=$P_0$), 20, 50, 200 messages received per second as the lower bound thresholds for Levels 0, 1, 2, and 3, respectively, although 10 or lower messages received per second would still qualify as Level 0 (460) because Level 0 (460) is the default filtering level. Time to reach $P_0$ (454) for Levels 0, 1, 2, and 3 are 1 (=$Tp_0$), 0.5, 0.2, and 0.05, respectively. Furthermore, filtering times (458) are 0, 0.2, 0.6, and 1.4 for Levels 0, 1, 2, and 3, respectively. Thus, for example, if the network device receives between 50 and 200 messages per second, or conversely if the network device takes between 0.05 and 0.2 seconds to receive 10 messages, the device can be assigned Level 2 (464) and the filtering time of Tf(2)=0.6 seconds. The numbers that are provided in table 450 are examples only and table 450 can have other numbers and a different number of levels. The numbers can be pre-assigned based on empirical evidence.

Having disclosed some basic system components and concepts, the disclosure now turns to the exemplary method embodiments shown in FIGS. 5A-5D and 6. For the sake of clarity, the methods are described in terms of network device 100, as shown in FIG. 1, configured to practice the method. However, the example methods can be practiced by any software or hardware components, devices, etc. heretofore disclosed, such as system 200, system 250, network 300, device 302, device 304, etc. The steps outlined herein are exemplary and can be implemented in any combination thereof in any order, including combinations that exclude, add, or modify certain steps.

Figure 5A:
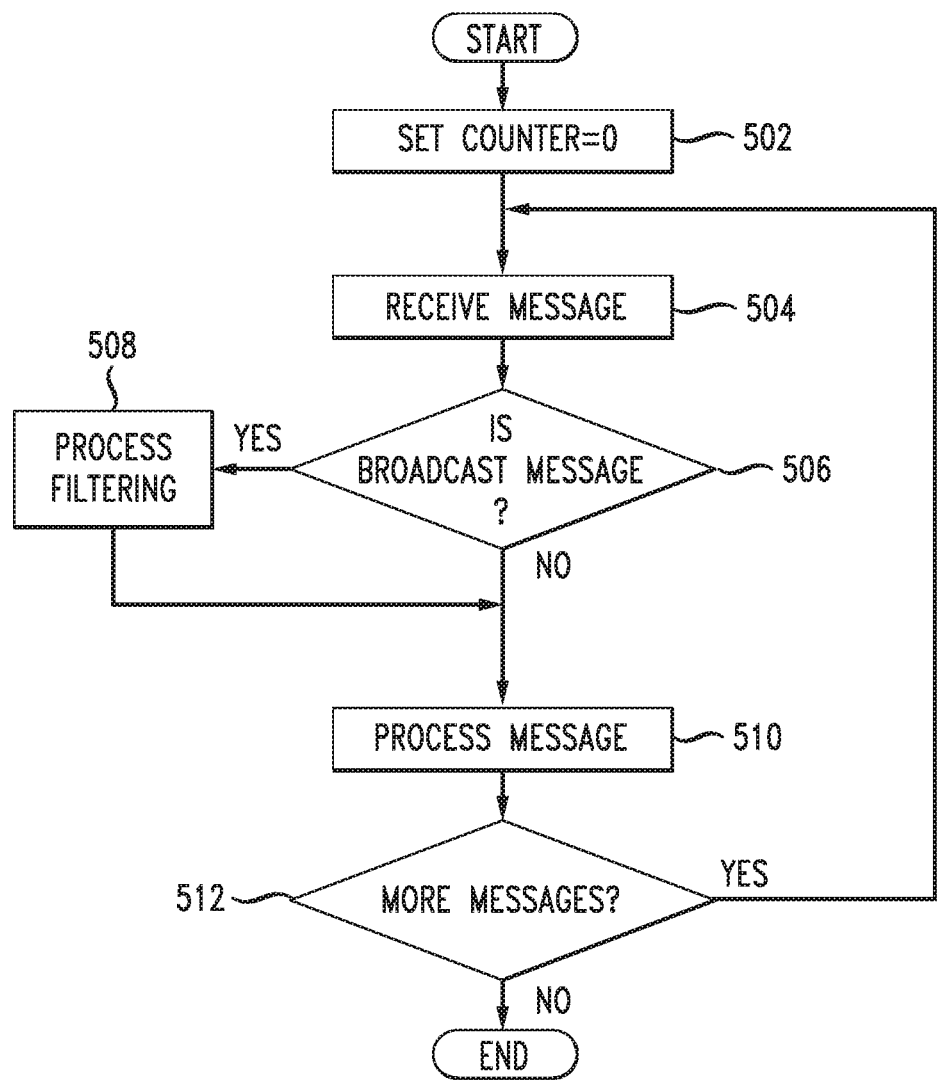
FIGS. 5A, 5B, 5C and 5D show example method embodiments for filtering broadcast messages.

FIG. 5A shows an example method embodiment for filtering broadcast messages. First, device 100 can set Counter to 0 (502). Counter can be a stored variable, counter, flag, etc. to keep track of how many broadcast messages have been received by network device 100 since Counter was last reset to 0. In task 504, network device 100 may receive a message. The message can be a cell, a frame, a packet, a datagram, etc. that may or may not be a broadcast message meant to be received by every node in the appropriate segment of the network. In task 506, it may be decided whether the received message is a broadcast message or not. For example, if the message is an Ethernet frame, it may be decided whether the destination MAC address included in the frame is "FF-FF-FF-FF-FF-FF." In another example, if the message is an IP packet, it may be decided whether the destination IP address included in the packet is a broadcast IP address, which may be determined by performing a bitwise OR operation between the bit complement of the subnet mask and the IP address of the host. If the message indeed is of a broadcast type, then network device 100 can process any filtering operations that may be necessary (508), then proceed to task 510. If the message is not of a broadcast type, then the method proceeds to task 510 without performing any filtering (508).

In task 510, network device 100 can process the message. For example, if the message is destined for network device 100, the device can simply consume the message by, for example, relaying the message to the appropriate recipient such as an application executing on network device 100. If the message is addressed to some other device in the network, network device 100 can forward the message to another device, switch, gateway, router, etc. If the message is a broadcast message, then network device 100 can broadcast the message such that the message can be reached by every node in the network. If the broadcast message was previously filtered out or dropped in task 508, then there may be no message left for network device 100 to process, in which case the method proceeds to task 512 without processing any messages. In task 512, network device 100 may determine whether there are any more packets to be received, and if so, proceed to task 504, or alternatively, end the process if there are no more messages. Network device 100 may wait until a new message is received.

Figure 5B:
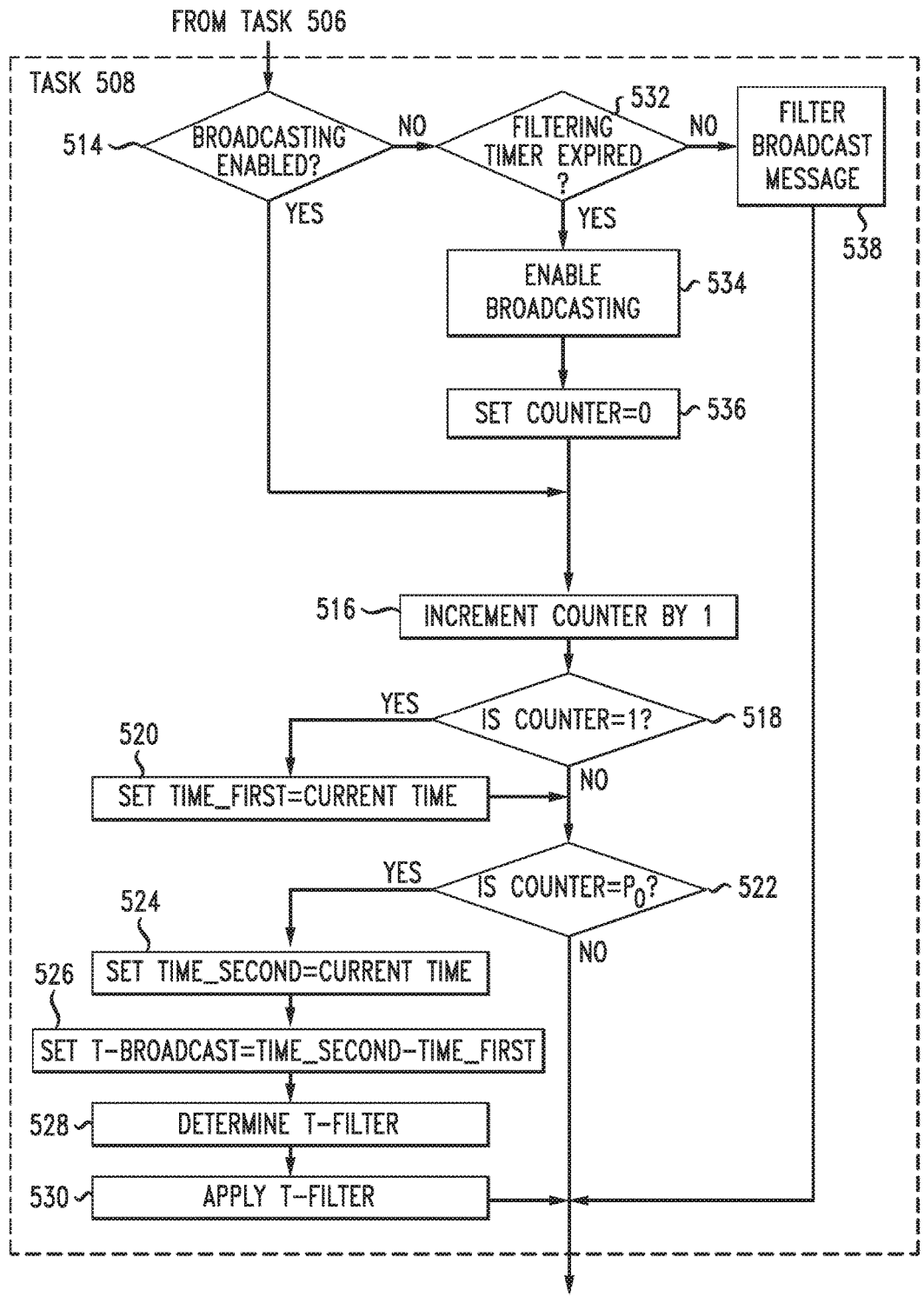

FIG. 5B shows a continuing example method embodiment for filtering broadcast messages. FIG. 5B picks up from task 506 of FIG. 5A and elaborates on what steps may be performed in task 508. When performing task 508, network device 100 may determine whether broadcast receiving is enabled at the moment for network device 100 (514). Whether broadcasting is enabled can be kept track of by a variable, a flag, a semaphore, a state value, etc. stored in the memory or the computer-readable storage medium within network device 100. For example, network device 100 can set a Boolean variable named BROADCAST_ENABLED to be TRUE when broadcasting is enabled or set the variable to be FALSE when disabled. If broadcasting is currently enabled, then network device 100 can increment Counter by 1 (516). In task 518, network device 100 determines the current value of Counter is 1, which signifies that network device 100 has received one broadcast message since Counter was last reset to 0. If the value is 1, then network device 100 records the current time (520) and then proceed to task 522. The current time can be recorded by storing the timestamp of the current time (e.g., "11/14/2009 04:16 AM"). For example, this time can be stored in a variable named TIME_FIRST. If Counter is not equal to 1, then the method proceeds to task 522.

In task 522, it is determined whether Counter is equal to $P_0$. In other words, it is determined whether $P_0$ broadcast messages have been received by network device 100 since Counter was set to 0. If $P_0$ has not been reached, then the method proceeds to task 510. However, if Counter is equal to $P_0$, then the method proceeds to task 524, where the current time is retrieved again by, for example, storing the second timestamp in a variable named TIME_SECOND. Then, the difference between the two times (i.e., TIME_SECOND−TIME_FIRST) is calculated. This value, represented as T-broadcast here, indicates the duration of time it took device 100 to receive $P_0$ broadcast messages since Counter was reset to 0. Next, the amount of filtering time (i.e., T-filter) is determined (528) and T-filter is applied (530), which will be further discussed below.

In task 514, if it is determined that broadcasting for network device 100 is currently disabled, then network device 100 determines whether the filtering timer has expired or not (532). The filtering timer, as will be discussed later in further detail, is used to keep track of the time that network device 100 is disabled from handling further broadcast messages. Thus, if the timer has not expired, then it implies that network device 100 is still in the disabled broadcasting mode and consequently the received broadcast message is filtered out or dropped (538). Filtering out a message may simply mean that the message is discarded and not handled or processed by network device 100. Thus, once the message is filtered out, there may not be a message to process in task 510 of FIG. 5A. If it is determined that the filtering timer has expired in task 532, it means that the filtering period has ended and that network device 100 no longer needs to filter out broadcast packets. Thus, broadcasting is enabled (534) for network device 100 and Counter is reset to 0 (536) such that the measurement of the time it takes to receive $P_0$ broadcast messages can be reinitiated. After the Counter reset, the method proceeds to task 516, where Counter is incremented by 1 to reflect the fact that a new broadcast message has been received by network device 100 after the previous filtering period has ended.

Figure 5C:
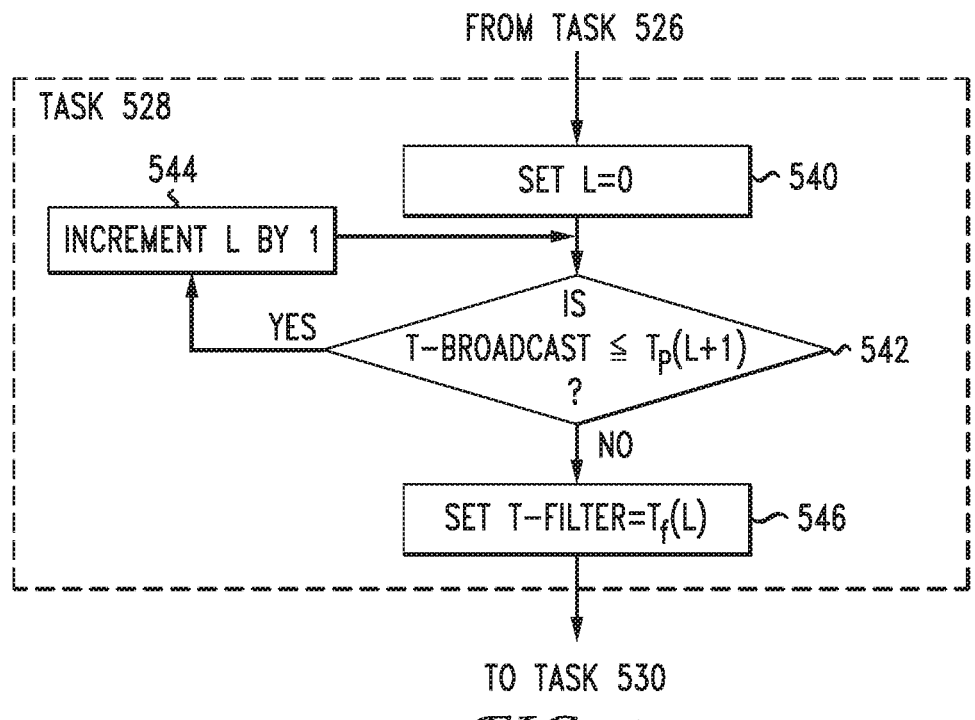

FIG. 5C shows a continuing example method embodiment for filtering broadcast messages. FIG. 5C picks up from task 526 of FIG. 5B and elaborates on what steps may be performed in task 528, where the filtering time T-filter is to be determined. In task 540, a variable named L is set to 0, where L represents the filtering level to be applied to network device 100 and 0 is the default filtering level. Then, network device 100 determines whether T-broadcast≤Tp(L+1). This can be accomplished, for example, by looking up the value of T-broadcast in a pre-determined table such as table 400 of FIG. 4A or table 450 of FIG. 4B. If it is determined that T-broadcast≤Tp(L+1), then it means that T-broadcast is small enough to raise the filtering level L to the next level. Thus, the value of L may be incremented by 1 (544) and the loop continues to task 542 until the inequality T-broadcast≤Tp(L+1) is no longer met, at which point the value of L will correspond to the appropriate filtering level for network device 100. In addition, if the highest filtering level available is reached after incrementing L by 1 in task 544, then the method may proceed to task 546 without determining whether T-broadcast≤Tp(L+1) because level L+1 does not exist. In task 546, the recommended filtering time for level L is retrieved from the table (i.e., Tf(L)) and T-filter is set to be equal to this value (546). In other words, T-filter=Tf(L). The process can now move back to task 530.

Figure 5D:
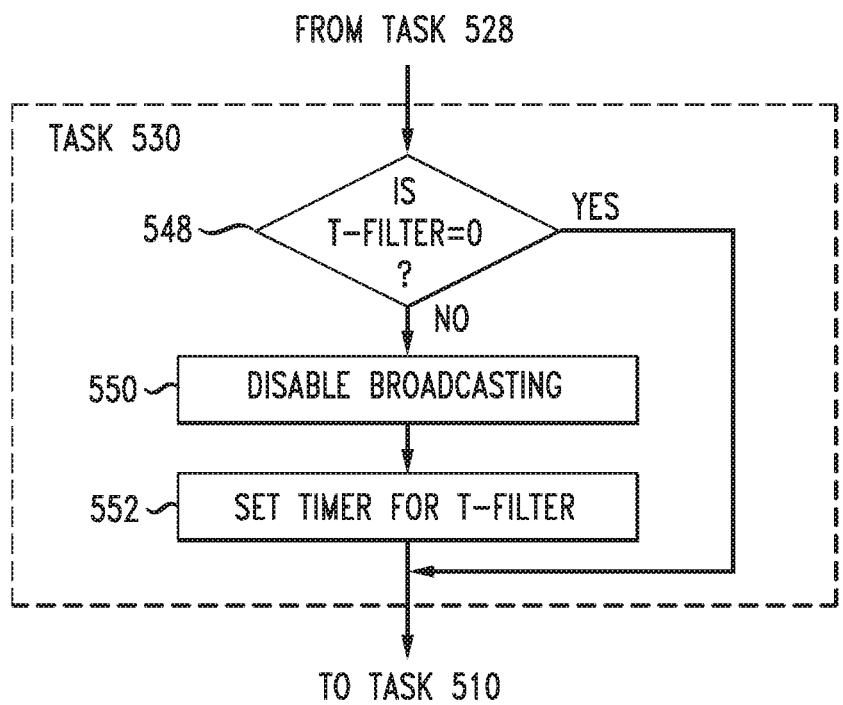

FIG. 5D shows a continuing example method embodiment for filtering broadcast messages. FIG. 5D picks up from task 528 of FIG. 5B and elaborates on what steps may be performed in task 530, where the filtering time T-filter is to be applied. In task 548, it is determined whether T-filter is equal to 0, which means that no filtering is required. If T-filter is 0, then the method proceeds to task 510 without performing any further actions. On the other hand, if T-filter is not 0 (and greater than 0), broadcasting is disabled for network device 100 (550). Furthermore, the filtering timer is set according to T-filter (552), whose value was determined in task 528. For example, if T-broadcast is 0.27 seconds and table 450 of FIG. 4B is being used to determine the filtering level and the filtering time, it may be determined that the appropriate filtering level is Level 1 and that the recommended filtering time is 0.2 seconds. Once the timer is set according to T-filter, further broadcast messages received at network device 100 will be filtered out until the timer expires, as illustrated in task 538 of FIG. 5B. After the timer expires, broadcasting will be re-enabled (534) and Counter will be reset to 0 (536).

Figure 6:
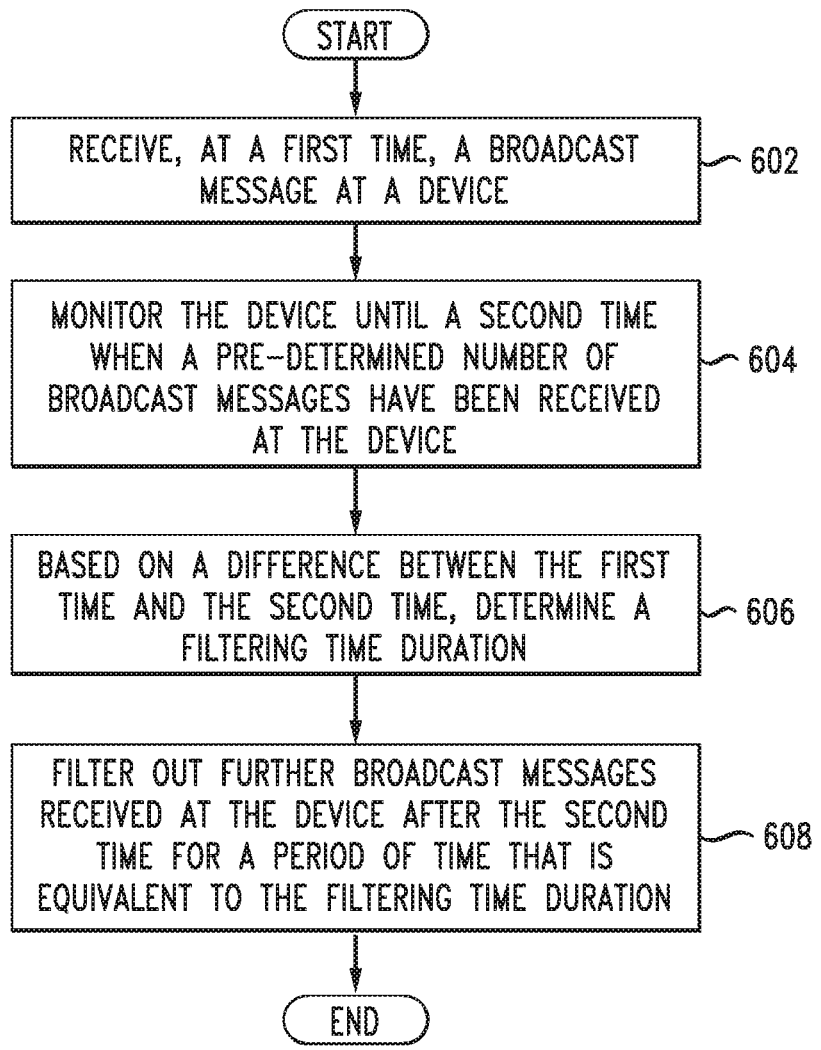
FIG. 6 shows another example method embodiment for filtering broadcast messages.

FIG. 6 shows another example method embodiment for filtering broadcast messages. For the sake of clarity, the method is described in terms of system 200, as shown in FIG. 2A, configured to practice the method. However, the example methods can be practiced by any software or hardware components, devices, etc. heretofore disclosed, such as network device 100, system 250, network 300, device 302, device 304, etc. First, system 200 can receive, at a first time, a broadcast message at a device (602). Upon receiving the broadcast message, system 200 may also set a counter to 1 and store the first time. System 200 may monitor the device until a second time when a pre-determined number of broadcast messages have been received at the device (604). Monitoring the device may be performed by receiving a message at the device, increasing the counter by 1 upon determining that the message is of a broadcast message type, and when the counter is equal to the pre-determined number, storing the second time.

Based on a difference between the first time and the second time, system 200 may determine a filtering time duration (606). Determining the filtering time duration can be done by looking up the difference in a pre-determined table that includes a plurality of time durations for receiving the pre-determined number of broadcast messages, wherein the plurality of time durations is mapped, in the pre-determined table, to respective filtering time durations. System 200 can then identify, among the plurality of time durations in the pre-determined table, a first time duration that is greater than or equal to the difference and a second time duration that is less than the difference to yield an identification, wherein the first time duration is mapped to a first filtering time duration and the second time duration is mapped to a second filtering time duration greater than the first filtering time duration. Based on the identification, system 200 can set the filtering time duration to be equal to the first filtering time duration.

System 200 can then filter out further broadcast messages received at the device after the second time for a period of time that is equivalent to the filtering time duration (608). Filtering out the further broadcast messages can include disabling the device from receiving any broadcast messages upon setting a timer according to the filtering time duration, and enabling the device to receive additional broadcast messages when the timer expires. System 200 can also reset the counter to 0 after the period of time ends.

Once task 608 is performed, the method can repeat the previously iterated steps to find the next filtering time duration. Thus, system 200 can receive, at a fourth time after the third time, a second broadcast message at the device. System 200 can monitor the device until a fifth time when the pre-determined number of broadcast messages have been received at the device since the third time. Based on a second difference between the fourth time and the fifth time, system 200 can determine a second filtering time duration. System 200 can filter out additional broadcast messages received at the device after the fifth time for a second period of time that is equivalent to the second filtering time duration. The second filtering time duration may be different from the first filtering time duration.

For clarity of explanation, in some instances the present technology may be presented as including individual functional blocks including functional blocks comprising devices, device components, steps or routines in a method embodied in software, or combinations of hardware and software. Computer-readable storage devices and media expressly exclude transitory media such as energy, carrier signals, electromagnetic waves, and signals per se.

Methods according to the above-described examples can be implemented using computer-executable instructions that are stored or otherwise available from computer readable media or devices. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A method comprising:
    receiving, at a first time, a broadcast message at a device;
    monitoring the device until a second time when a pre-determined number of broadcast messages have been received at the device;
    based on a difference between the first time and the second time, determining a filtering time duration by looking up the difference in a pre-determined table comprising a plurality of time durations for receiving the pre-determined number of broadcast messages, wherein the plurality of time durations is mapped, in the pre-determined table, to respective filtering time durations, wherein determining the filtering time duration comprises: identifying, among the plurality of time durations in the pre-determined table, a first time duration that is greater than or equal to the difference and a second time duration that is less than the difference to yield an identification, the first time duration being mapped to a first filtering time duration while the second time duration being mapped to a second filtering time duration greater than the first filtering time duration; and based on the identification, setting the filtering time duration to be equal to the first filtering time duration; and
    disabling the device from receiving further broadcast messages after the second time for a period of time that is equivalent to the filtering time duration.

2. The method of claim 1, further comprising:
    upon receiving the broadcast message:
        setting a counter to 1; and
        storing the first time.

3. The method of claim 2, wherein monitoring the device comprises:
    receiving a message at the device;
    upon determining that the message is of a broadcast message type, increasing the counter by 1; and
    when the counter is equal to the pre-determined number, storing the second time.

4. The method of claim 3, wherein filtering out the further broadcast messages comprises: resetting the counter to 0 after the period of time ends.

5. The method of claim 1, wherein filtering out the further broadcast messages comprises:

upon setting a timer according to the filtering time duration, disabling the device from receiving any broadcast messages; and when the timer expires, enabling the device to receive additional broadcast messages.

6. The method of claim 1, wherein the period of time ends at a third time, the method further comprising:

receiving, at a fourth time after the third time, a second broadcast message at the device;

monitoring the device until a fifth time when the pre-determined number of broadcast messages have been received at the device since the third time;

based on a second difference between the fourth time and the fifth time, determining a second filtering time duration; and filtering out additional broadcast messages received at the device after the fifth time for a second period of time that is equivalent to the second filtering time duration.

7. A system comprising:

a network device;

a processor; and a computer-readable storage medium storing instructions which, when executed by the processor, cause the processor to perform operations comprising:

receiving, at a first time, a broadcast message at the network device;

monitoring the network device until a second time when a pre-determined number of broadcast messages have been received at the network device;

based on a difference between the first time and the second time, determining a filtering time duration by looking up the difference in a pre-determined table comprising a plurality of time durations for receiving the pre-determined number of broadcast messages, wherein the plurality of time durations is mapped, in the pre-determined table, to respective filtering time durations, wherein determining the filtering time duration comprises: identifying, among the plurality of time durations in the pre-determined table, a first time duration that is greater than or equal to the difference and a second time duration that is less than the difference to yield an identification, the first time duration being mapped to a first filtering time duration while the second time duration being mapped to a second filtering time duration greater than the first filtering time duration; and based on the identification, setting the filtering time duration to be equal to the first filtering time duration; and disabling the device from receiving further broadcast messages after the second time for a period of time that is equivalent to the filtering time duration.

8. The system of claim 7, the computer-readable storage medium storing additional instructions which, when executed by the processor, cause the processor to perform further operations comprising:

upon receiving the broadcast message:
setting a counter to 1; and
storing the first time.

9. The system of claim 8, wherein monitoring the device comprises:

receiving a message at the network device;

upon determining that the message is of a broadcast message type, increasing the counter by 1; and when the counter is equal to the pre-determined number, storing the second time.

10. The system of claim 9, wherein filtering out the further broadcast messages comprises: resetting the counter to 0 after the period of time ends.

11. The system of claim 7, wherein filtering out the further broadcast messages comprises:

upon setting a timer according to the filtering time duration, disabling the network device from receiving any broadcast messages; and when the timer expires, enabling the network device to receive additional broadcast messages.

12. The system of claim 7, wherein the period of time ends at a third time, and wherein the computer-readable storage medium stores additional instructions which, when executed by the processor, cause the processor to perform further operations comprising:

receiving, at a fourth time after the third time, a second broadcast message at the network device;

monitoring the network device until a fifth time when the pre-determined number of broadcast messages have been received at the network device since the third time;

based on a second difference between the fourth time and the fifth time, determining a second filtering time duration; and filtering out additional broadcast messages received at the network device after the fifth time for a second period of time that is equivalent to the second filtering time duration.

13. A computer-readable storage device storing instructions which, when executed by a processor, cause the processor to perform operations comprising:

receiving, at a first time, a broadcast message at a device;

monitoring the device until a second time when a pre-determined number of broadcast messages have been received at the device;

based on a difference between the first time and the second time, determining a filtering time duration by looking up the difference in a pre-determined table comprising a plurality of time durations for receiving the pre-determined number of broadcast messages, wherein the plurality of time durations is mapped, in the pre-determined table, to respective filtering time durations, wherein determining the filtering time duration comprises: identifying, among the plurality of time durations in the pre-determined table, a first time duration that is greater than or equal to the difference and a second time duration that is less than the difference to yield an identification, the first time duration being mapped to a first filtering time duration while the second time duration being mapped to a second filtering time duration greater than the first filtering time duration; and based on the identification, setting the filtering time duration to be equal to the first filtering time duration; and disabling the device from receiving further broadcast messages after the second time for a period of time that is equivalent to the filtering time duration.

14. The computer-readable storage device of claim 13, storing additional instructions which, when executed by the processor, cause the processor to perform further operations comprising:

upon receiving the broadcast message:
setting a counter to 1; and
storing the first time.

15. The computer-readable storage device of claim 14, wherein monitoring the device comprises:

receiving a message at the device;

upon determining that the message is of a broadcast message type, increasing the counter by 1; and when the counter is equal to the pre-determined number, storing the second time.

16. The computer-readable storage device of claim 13, wherein filtering out the further broadcast messages comprises:

upon setting a timer according to the filtering time duration, disabling the device from receiving any broadcast messages; and when the timer expires, enabling the device to receive additional broadcast messages.

17. The computer-readable storage device of claim 13, wherein the period of time ends at a third time, and wherein the computer-readable storage device stores additional instructions which, when executed by the processor, cause the processor to perform further operations comprising:

receiving, at a fourth time after the third time, a second broadcast message at the device;

monitoring the device until a fifth time when the pre-determined number of broadcast messages have been received at the device since the third time;

based on a second difference between the fourth time and the fifth time, determining a second filtering time duration; and filtering out additional broadcast messages received at the device after the fifth time for a second period of time that is equivalent to the second filtering time duration.

* * * * *